Patented Nov. 29, 1932

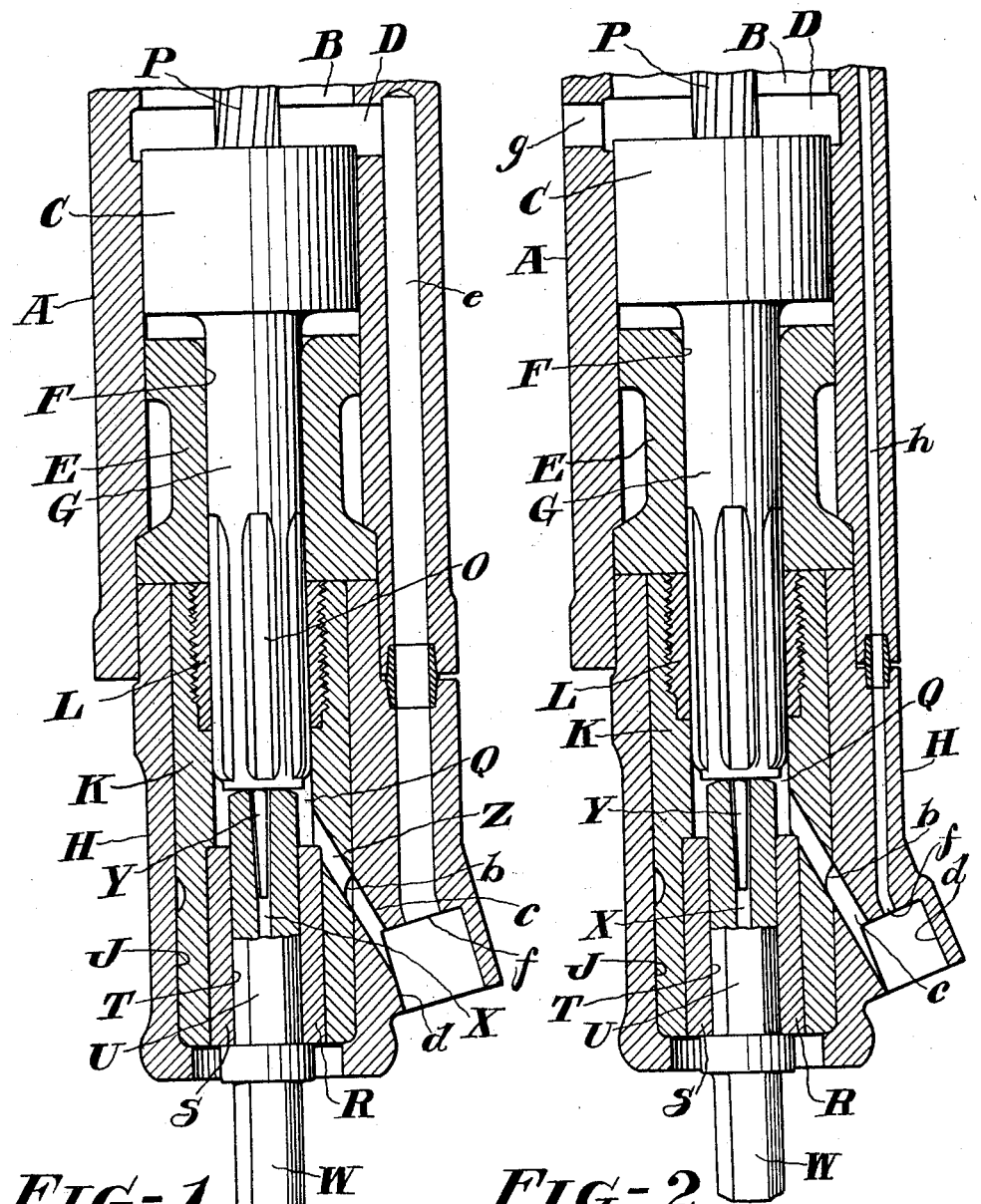

1,889,422

UNITED STATES PATENT OFFICE

JAMES F. SHOOK, OF PHILLIPSBURG, NEW JERSEY, ASSIGNOR TO INGERSOLL-RAND COMPANY, OF JERSEY CITY, NEW JERSEY, A CORPORATION OF NEW JERSEY

DUSTLESS ROCK DRILL

Application filed August 22, 1929. Serial No. 387,641.

This invention relates to fluid actuated rock drills, and more particularly to rock drills of the hammer type equipped with means for supplying cleansing fluid to the hole being drilled.

One object of the invention is to prevent the entrance of pressure fluid into the drill hole and the consequent conveyance of dust in a dry form from the drill hole.

Other objects will be in part obvious and in part pointed out hereinafter.

In the accompanying drawing,

Figure 1 is a sectional elevation of a portion of a rock drill constructed in accordance with the practice of the invention, and Figure 2 is a similar view showing a modification of the invention.

Referring to the drawing, the invention is shown embodied in a rock drill comprising a cylinder A wherein is formed a piston chamber B to accommodate a reciprocatory hammer piston C. The piston chamber B is provided with an exhaust port D which is controlled by the piston C and a closure is provided for the forward end of the piston chamber by a front cylinder washer E disposed in this instance in the cylinder A.

In the front cylinder washer E is a bore F to receive slidably an extension G of the piston C.

Extending into the forward end of the cylinder A is a front head H which abuts the forward end of the front cylinder washer E and has a bore J to receive a chuck K adapted to rotate therein. The chuck K is accordingly provided with a chuck nut L threaded in the rearward end of the chuck to interlock with flutes O in the piston extension G and the piston may be in fluted engagement in a well known manner with a rifle bar P whereby the piston, and consequently the chuck, may be rotated.

Within the chuck K is a bore Q preferably enlarged at its forward end as at R to receive a chuck bushing S which may be press fitted into the bore R or otherwise suitably secured to the chuck K. The chuck bushing S is provided with a bore T to receive a shank U of a working implement W such as a drill steel and in the working implement W is a passage X for conveying cleansing fluid, as for instance water, to the hole being drilled for removing the cuttings therefrom. Such cleansing fluid may be conveyed through the drill and into the passage X of the working implement W by a tube Y which extends through the percussive element of the drill and with its forward end into the passage X.

In the operation of the drill so far described, upon the admission of pressure fluid to the front end of the piston chamber for actuating the piston C rearwardly a portion of such pressure fluid may and frequently does find its way along the piston extension G into the bore Q. Unless the chuck is provided with suitable means for venting the bore Q this pressure fluid flows through the passage X into the drill steel and into the drill hole where it forms bubbles which, in rising through the water wherewith the drill hole is being flooded, will carry with them fine particles of dust in a dry form. Such dust, when inhaled, has in many instances been found to be detrimental to the health of the attendant, and in all cases its presence in the vicinity of the drilling operation is decidedly objectionable.

Various means have heretofore been employed for preventing the admission of leakage pressure fluid into the drill steel, as for instance, by providing the bore Q with an outlet or vent intended to convey the pressure fluid from the chuck cavity. This arrangement has however, been found to not entirely eliminate the undesirable condition referred to for the reason that where a water tube is employed for conveying water to the drill hole the jet of water issuing therefrom into the passage in the drill steel will act as an injector and will draw air into the drill steel.

Means are herein provided to insure against the admission of air, either atmospheric or such compressed air as may leak from the piston chamber into the bore Q, from entering the passage X in the drill steel. To this end the chuck K is provided with a vent Z which leads from an intermediate portion of the bore O at a point adjacent the shank U of the drill steel to an annular groove $b$ in the periphery of the chuck K, and in the front head H is a vent $c$ in constant communication with the groove $b$. The vent $c$ opens with its other end into a recess $d$ in the front head and preferably on the side thereof.

In order to create a sub-atmospheric pressure in the bore Q adjacent the inlet passage X a passage $e$ is formed in the front head and the cylinder to convey exhaust fluid from the exhaust port D into the recess $d$. The outlet opening $f$ of the passage $e$ is preferably so arranged that the jet of fluid issuing therefrom is directed across the outlet opening of the vent $c$ and thus serves as an ejector for drawing the air from the bore Q.

In the modification illustrated in Figure 2 the cylinder A is provided with an exhaust port $g$ which opens directly to the atmosphere in the cylinder A. In the front head H is a passage $h$ which may lead from a suitable source of supply and opens into the recess $d$ in such a manner that the jet of pressure fluid issuing therefrom will also be directed across the outlet opening of the vent $c$ for evacuating the bore Q of such pressure fluid as may find its way thereinto, or such atmospheric air as may find entrance into the bore Q along the cooperating surface of the working implement and the chuck bushing S.

I claim:

In a fluid actuated rock drill, the combination of a cylinder and a piston therein, a front head for the cylinder having a recess communicating with the atmosphere and being located adjacent the front end of the front head, a chuck in the front head having a bore, a hollow working implement extending into the bore, a vent leading from the bore adjacent the working implement to the recess, and a passage in the cylinder and the front head opening into the recess for directing a jet of fluid across the outlet opening of the vent to withdraw pressure fluid leaking from the cylinder into the bore and thus prevent the admission of such pressure fluid into the working implement and to maintain a sub-atmospheric pressure in the bore.

In testimony whereof I have signed this specification.

JAMES F. SHOOK.